United States Patent [19]

Frimley

[11] Patent Number: 5,016,312
[45] Date of Patent: May 21, 1991

[54] WASHER ARRANGEMENT FOR A WINDSCREEN WIPER

[75] Inventor: Charles H. Frimley, Windsor, England

[73] Assignee: Trico Products Corporation, Buffalo, N.Y.

[21] Appl. No.: 314,524

[22] Filed: Feb. 23, 1989

[30] Foreign Application Priority Data

Feb. 25, 1988 [GB] United Kingdom ............ 8804359

[51] Int. Cl.⁵ .................................. B60S 1/46
[52] U.S. Cl. ........................... 15/250.04; 15/250.32; 239/284.1; 403/330
[58] Field of Search ........... 15/250.01, 250.02, 250.03, 15/250.04, 250.09, 250.31, 250.32, 250.33, 250.42; 239/284.1; 403/326, 330

[56] References Cited

U.S. PATENT DOCUMENTS

| | | | |
|---|---|---|---|
| 3,179,969 | 4/1965 | Glynn | 15/250.32 |
| 3,440,678 | 4/1969 | Tibbet | 15/250.04 |
| 3,657,762 | 4/1972 | Arman | 15/250.32 |
| 3,854,161 | 12/1974 | Benson | 15/250.42 |
| 3,940,068 | 2/1976 | Mohnach et al. | 15/250.04 |

FOREIGN PATENT DOCUMENTS

| | | | |
|---|---|---|---|
| 3603468 | 8/1987 | Fed. Rep. of Germany | 15/250.04 |
| 2379411 | 10/1978 | France | 15/250.04 |
| 2421765 | 12/1979 | France | 15/250.32 |
| 8103308 | 11/1981 | PCT Int'l Appl. | 15/250.32 |
| 1546343 | 5/1979 | United Kingdom . | |
| 2021936 | 12/1979 | United Kingdom . | |
| 2186021 | 8/1987 | United Kingdom . | |

*Primary Examiner*—Timothy F. Simone
*Assistant Examiner*—Mark Spisich
*Attorney, Agent, or Firm*—Biebel, French & Nauman

[57] ABSTRACT

A washer arrangement is provided for a windscreen wiper which comprises a wind screen wiper blade B, a windscreen wiper arm (22) for driving the windscreen wiper blade and a connector element (1) for connecting the windscreen wiper arm (22) to the windscreen wiper blade. The arrangement comprises a connector element (1) carrying one or more washing nozzles (17, 18).

16 Claims, 3 Drawing Sheets

WASHER ARRANGEMENT FOR A WINDSCREEN WIPER

This invention relates to a washer arrangement for a windscreen wiper for vehicles.

Many different methods have been used in conjunction with windscreen wipers for washing windscreens and so improve visibility. Basically there are two main types:

1. Stationary jets—in which jets of washing fluid are directed onto the screen from nozzles located in various areas of the vehicle body work.

2. Travelling jets—in which nozzles are carried by the wiper itself and travel across the screen therewith. These nozzles direct washing fluid onto the windscreen, usually in advance of the wiping element or rubber of the wiper blade.

It is with this latter type of system that the present invention is concerned.

In the past, nozzles have been carried either by the windscreen wiper blade or by the windscreen wiper arm. In the former case, there is the disadvantage that in order to replace the blade, various hoses of the washer system need to be disconnected before detachment and reconnected after replacement of the blade. Furthermore, specialised blades are necessary which significantly increases the cost of the installation.

In these respects, positioning of the nozzles on the arm itself are a distinct advantage, but such arrangements suffer from other disadvantages not present with blade mountings. For example, the relative positions of arms and blades is such that in many cases it is difficult, if not impossible, to position the nozzles so that they spray the washing fluid adequately in front of the blade. This situation is aggravated by the modern tendency to have a very low profile of the wiping system so that in many applications, the arm lies alongside but behind the blade.

The present invention seeks to reduce or substantially obviate some or all of these disadvantages.

According to the invention, there is provided a washer arrangement for a windscreen wiper which comprises a wind screen wiper blade, a windscreen wiper arm for driving the windscreen wiper blade and a connector element for connecting the windscreen wiper arm to the windscreen wiper blade, the arrangement comprising a connector element carrying one or more washing nozzles.

It is to be understood that the term "connector element" used throughout this specification is intended to cover not only arrangments in which the connector is detachable from both the arm and the blade but also those in which it is permanently attached to the arm so as to provide a termination therefore.

Preferably a nozzle head is provided on the connector element, the nozzle head carrying a plurality of nozzles pointing in different directions.

The connector element may include a central block portion adapted to sit within an aperture formed in the primary yoke of the windscreen wiper blade and which carries the nozzle head, first attachment means for attaching the connector element to a windscreen wiper arm and second attachment means for attaching the block portion with sufficient play in the said aperture to allow pivotal movement between the block portion and the windscreen wiper blade, the second attachment means being provided with spring retention means movable between a first stable position in which it retains the joint body in the windscreen wiper blade and a second, unstable position in which the central block portion can be assembled on the windscreen wiper blade.

The invention will now be described in greater detail, by way of example, with reference to the drawings, in which.

Figure 1:
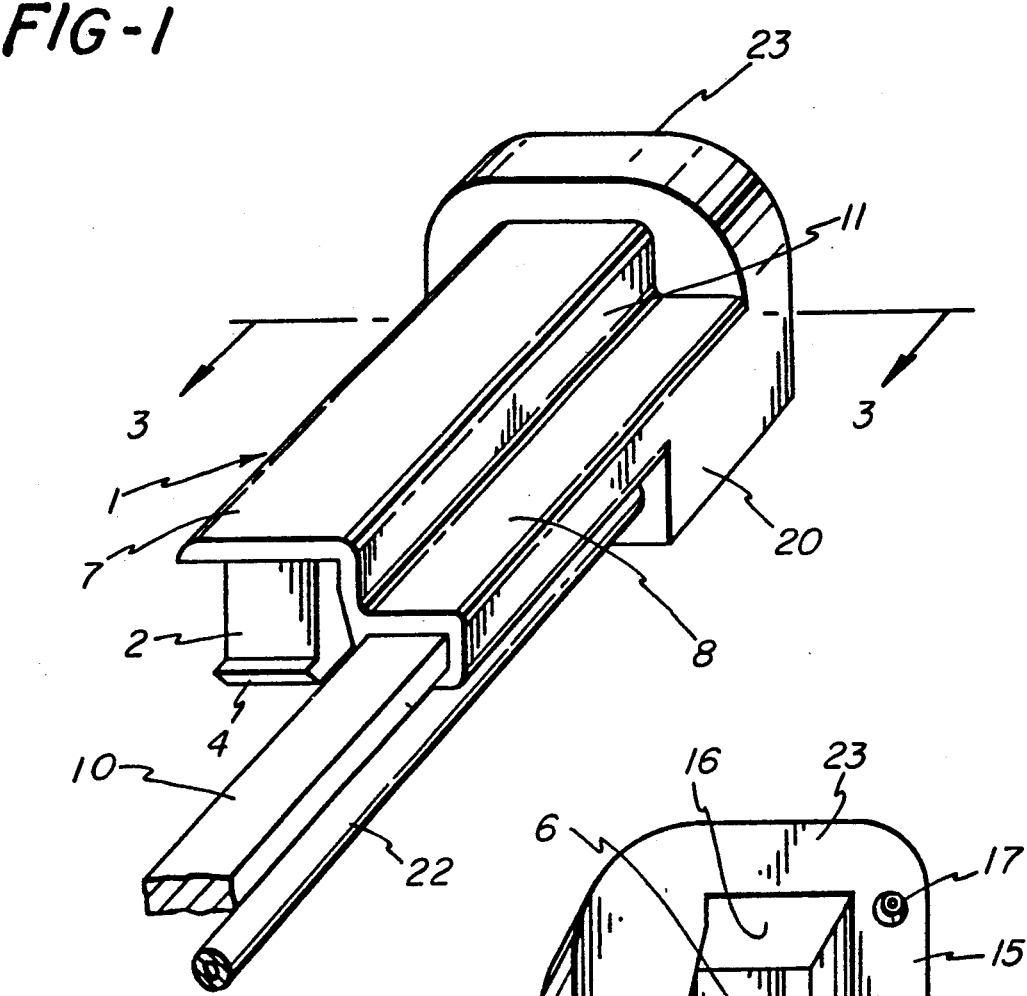
FIG. 1 is a perspective view from above of one form of connector element in accordance with the invention.
Figure 2:
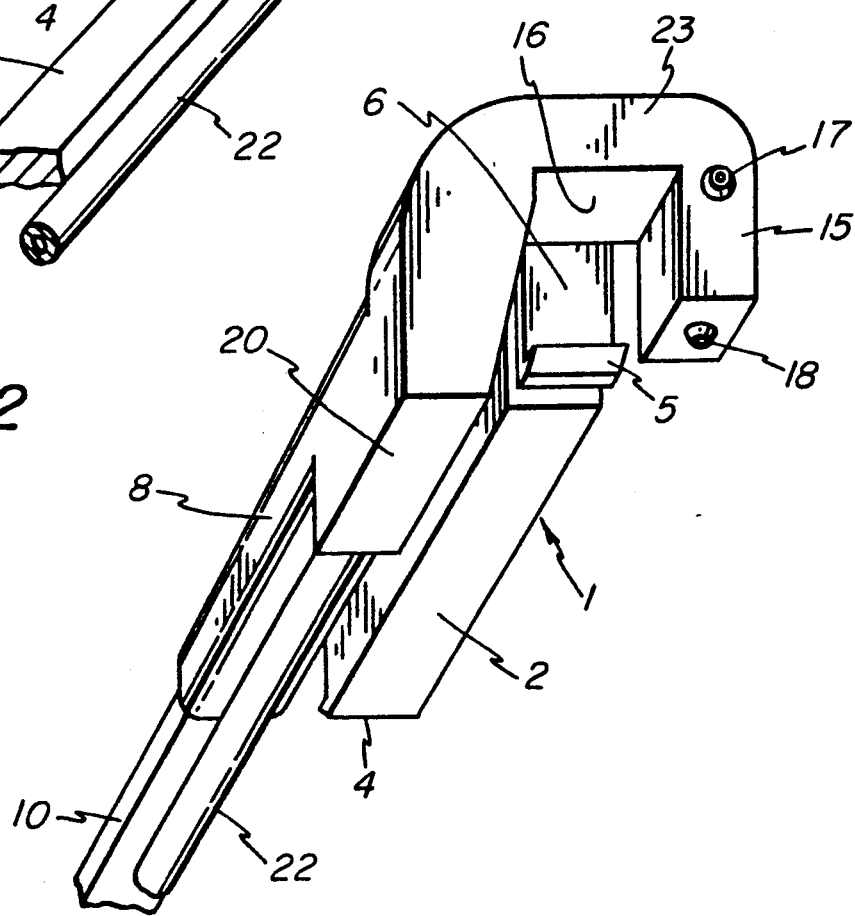
FIG. 2 is a perspective view from below of the connector element of FIG. 1.

Basically, the connector 1 shown is of the form described and shown in FIG. 10 of our prior Great Britain Patent Application No. 87/01948. It is intended to cooperate with an aperture formed in the primary yoke of a windscreen wiper blade harness (not shown) and to this end has a central block portion 2 adapted to sit within this aperture. A fixed projecting lip 4 is provided at one end and a movable projecting lip 5 is provided on a resilient tongue 6 at the other end. The block portion 2 is provided with a head portion 7 which prevents the block portion 2 of the connector element 1 passing right through the aperture in the primary yoke.

The connector element is provided with a tubular part 8 of rectangular cross section for receiving the end of a windscren wiper arm 10 and this tubular part 8 is connected to the head portion 7 by means of a connecting portion 11 which extends at right angles both to the head portion 7 and the tubular part 8.

The interaction of the connector element 1 with the windscreen wiper blade itself is described in considerable detail in our previously mentioned prior Application and will not be discussed in detail here. Very briefly, the end of the block portion 2 carrying the resilient lip 5 is pushed into the yoke aperture and against one end thereof, flexing the tongue 6 and allowing the other end of the block portion 2 to enter the aperture. Once in place, the tongue 6 flexes back and the connector is retained pivotally in the aperture between the head portion 7 and the two lips 4 and 5.

To provide for the travelling jets, the connector element 1 is formed with a nozzle head 15 which depends, on the outside of the blade, from an extension 16 of the head portion 7. The head 15 is equipped, in the embodiment shown with three nozzles 17, 18 and 19 of which the nozzle 17 points forwards, the nozzle 18 points downwards and the nozzle 19 points backwards.

Figure 3:
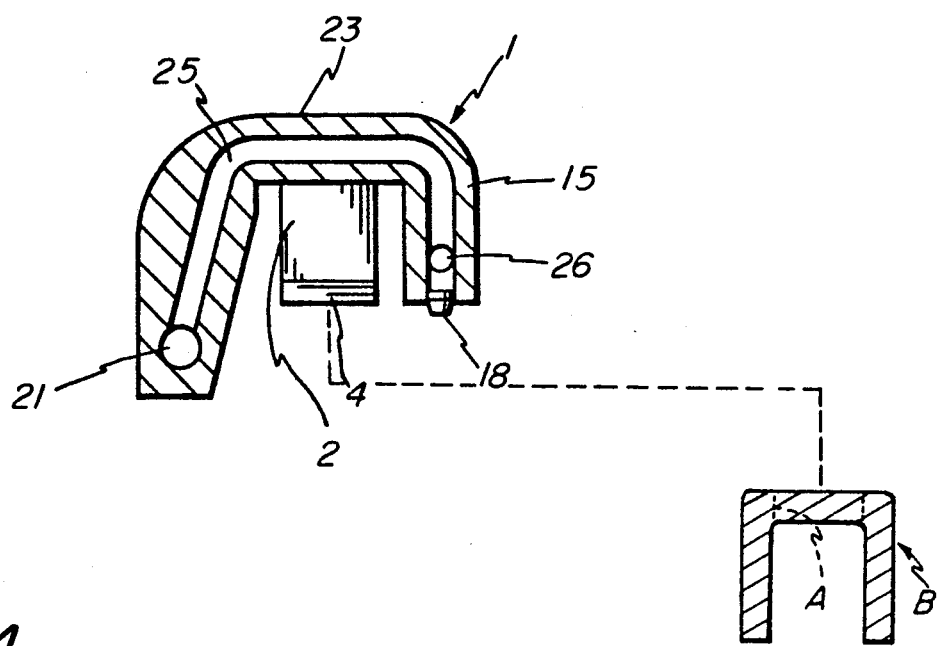
FIG. 3 is a sectional view of the connector element taken on the line III—III of FIG. 1 and further shows a sectional view of the wiper blade adapted for receipt in the connector element.
Figure 4:
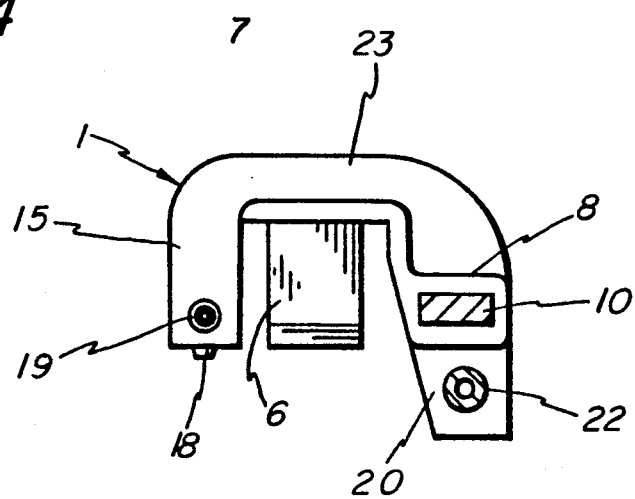
FIG. 4 is an end view of the connector element taken in the direction of the arrow IV of FIG. 1.
Figure 5:
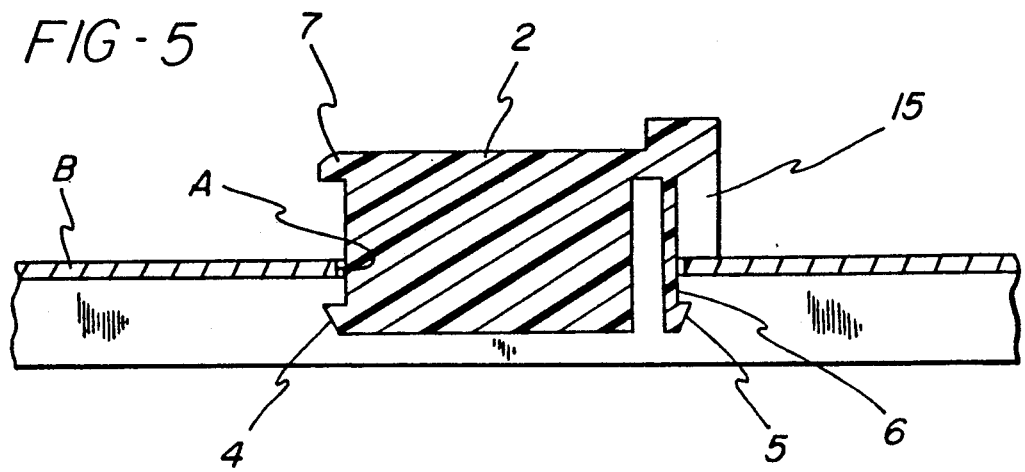
FIG. 5 is a cross-section view through lines V—V of FIG. 3.
Figure 6:
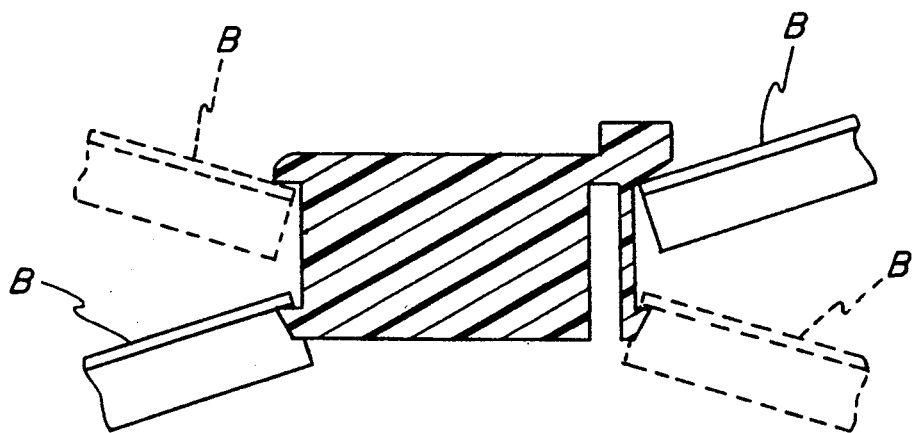
FIG. 6 is a view similar to that of FIG. 5 showing in solid line the pivotal extent of the wiper blade relative to the connector in one direction, and in phantom the pivotal extent of the wiper blade relative to the connector member in the opposite direction.

An extension 20 is situated beneath the tubular part 8 and contains a hose connecting bore 21 (FIG. 3) to which a hose 22 is connected. Because of this position of the hose connection, the hose can be carried on the underside of the wiper arm 10. The hose connection is connected around the extremity of the connector element 1 by a rib portion 23 which carries passages as can be seen in the sectional view of FIG. 3. As FIG. 3 shows, the hose connecting bore 21 is connected to an elongate passage 25 which extends through the rib portion 23 and into the nozzle head 15. Here its end is closed by the nozzle 18. One side bore 26 for the nozzle 19 can be seen, the other bore for the nozzle 17 not being visible.

It will be appreciated that while the invention has been described in relation to one particular type of connector element, the invention could equally well be applied to other types of connector. Many modifications are possible without departing from the scope of the invention. For example, the number and positioning of the nozzles may be varied as desired. The position of the nozzle head could be varied. In fact, the nozzle head could be omitted and use could be made of one or more discrete nozzles.

I claim:

1. A washer arrangement for a windscreen wiper comprising a windscreen wiper blade, a windscreen wiper arm for driving the windscreen wiper blade and a connector element for connecting the windscreen wiper arm and the windscreen wiper blade, where the wiper blade includes a central opening therein and the connector is at least partially received within said central opening and pivotally retained therein, and the connector element is fixedly mounted to the wiper arm, the connector element including at least one washing nozzle in communication with a passage within said connector element adapted to direct fluid to said nozzle.

2. A washer arrangement as claimed in claim 1, wherein a nozzle head is provided on the connector element, the nozzle head carrying a plurality of nozzles pointing in different directions.

3. A washer arrangement as claimed in claim 2, wherein the connector element includes a central block portion adapted to sit within an aperture formed in a primary yoke of the windscreen wiper blade and which carries the nozzle head, first attachment means for attaching the connector element to the windscreen wiper arm and second attachment means for attaching the block portion with sufficient play in the said aperture to allow pivotal movement between the block portion and the windscreen wiper blade, the second attachment means being provided with spring retention means movable between a first stable position in which it retains the block portion in the windscreen wiper blade and a second, unstable position in which the central block portion can be assembled on the windscreen wiper blade.

4. A washer arrangement as claimed in claim 3, wherein said block portion has a head portion adapted to prevent said block portion from passing right through the aperture and said first attachment means comprises a tubular part of rectangular cross section for receiving an end of the windscreen wiper arm, this tubular part being connected to said head portion by a connecting portion which extends at right angles both to said head portion and said tubular part.

5. A washer arrangement as claimed in claim 4, wherein the nozzle head depends downwardly towards the surface of the windscreen.

6. A washer arrangement as claimed in claim 5, wherein the nozzle head is provided with three nozzles pointing in three directions, one direction being such as to deposit a first jet of washer fluid downwardly onto the windscreen and the other two directions being such as to deposit jets of washer fluid on to the windscreen to opposite sides of the first jet.

7. A washer arrangement as claimed in claim 5 or 6, wherein ducting is provided for connecting the nozzles to a position adjacent to the tubular portion of the connector element, at which position the ducting is provided with a hose connection.

8. In a windshield wiper arrangement which comprises a driven wiper arm and an attached windshield wiper blade assembly, where the wiper blade assembly is pivotal relative to the wiper arm, and comprises an elongate yoke having a central opening therethrough, and a wiper blade attached to the elongate yoke, a connection member which connects the elongate yoke to the wiper arm, said connector member comprising:

a block portion which is receivable into the central opening of the elongate yoke;
means for latching said block portion to the elongate yoke;
means for retaining the wiper arm to said block portion; and
at least one fluid spray nozzle attached to said block portion, said fluid spray nozzle being in communication with a passage within said connector element adapted to direct fluid to said spray nozzle.

9. The connection member of claim 8, wherein said block portion is pivotally mounted to the elongate yoke and fixedly mounted to the wiper arm.

10. The connection member of claim 8, wherein said retention means comprises a tubular part attached to said block portion profiled for slidable retentive receipt of the wiper arm.

11. The connection member of claim 10 wherein said tubular part is integral with said block portion but laterally offset therefrom, thereby forming a slot between said block portion and said tubular portion for the receipt of a sidewall of the elongate yoke therethrough.

12. The connection member of claim 8 wherein said latching means comprises a head portion, attached to said block portion, where said head portion has at least one dimension larger than that of the central opening to prevent said block from passing directly through the central opening, and lips extending from said block portion, said lips and said head portion being spaced apart a distance greater than a thickness of the elongate yoke, whereby the elongate yoke is pivotally retained between said head portion and said lips.

13. The connection member of claim 12, wherein said head portion is formed integrally with said block portion, and at least one of said lips is flexibly connected to said block portion.

14. The connection member of claim 8, wherein said block portion further includes an extension portion having a bore in communication with said passage.

15. The connection member of claim 14, wherein a spray head is attached to said block portion on a side opposite said block portion as said extension portion, said spray head housing the fluid spray nozzle.

16. The connection member of claim 15, further comprising a rib portion extending between said spray head and said extension portion, said rib portion, said spray head portion, and said extension portion having a continuous elongate fluid passageway therethrough, interconnecting said fluid supply means with said fluid spray nozzle.

* * * * *